| United States Patent [19] | [11] Patent Number: 4,925,702 |
| Reddy | [45] Date of Patent: May 15, 1990 |

[54] PROCESS FOR IMPROVING THE LUMINESCENCE AND BULK DENSITY OF NIOBIUM ACTIVATED YTTRIUM TANTALATE X-RAY PHOSPHOR

[75] Inventor: Vaddi B. Reddy, Sayre, Pa.

[73] Assignee: GTE Products Corporation, Stamford, Conn.

[21] Appl. No.: 416,199

[22] Filed: Oct. 2, 1989

[51] Int. Cl.$^5$ ............................................. C09K 11/79
[52] U.S. Cl. ................... 427/65; 252/301.4 R; 252/301.4 F; 427/219
[58] Field of Search .................. 252/301.4 R, 301.4 F; 427/65, 219

[56] References Cited

U.S. PATENT DOCUMENTS

| 3,459,674 | 8/1969 | Emoto et al. | 252/301.4 R |
| 4,024,069 | 5/1977 | Larach | 252/301.4 R |
| 4,225,653 | 9/1980 | Brixner | 428/539 |
| 4,690,832 | 9/1987 | Yale | 252/301.4 F |
| 4,707,635 | 11/1987 | Tateyama et al. | 252/301.4 F |
| 4,717,590 | 1/1988 | Wolfe et al. | 427/219 |

FOREIGN PATENT DOCUMENTS

| 202875 | 11/1986 | European Pat. Off. | 252/301.4 R |
| 49-34311 | 9/1974 | Japan | 252/301.4 R |
| 511038 | 8/1939 | United Kingdom | 252/301.4 F |
| 2035358 | 6/1980 | United Kingdom | 252/301.4 F |

OTHER PUBLICATIONS

Brixner & Chen (J. Electrochemical Soc., 130 (12), 1983, 2435-43), "On the Structural and Luminescent Properties of the M'LnTaO$_4$ Rare Earth Tantalates".

Primary Examiner—Jack Cooper
Attorney, Agent, or Firm—Robert E. Walter; L. Rita Quatrini

[57] ABSTRACT

A process is disclosed for producing M' phase YTaO$_4$:Nb X-ray phosphor which comprises forming a mixture of components Y$_2$O$_3$, Ta$_2$O$_5$, and Nb$_2$O$_5$, and a flux which can be lithium chloride, lithium sulfate or a mix of lithium sulfate and potassium sulfate in an 80 to 20 mole ratio, the flux making up about 25% to 50% by weight of the mixture, the components being provided in stoichiometric amounts to form the phosphor, firing the mixture in a furnace by heating to a temperature of about 1200° C. to 1300° C. at a heating rate of about 1.0° C./min. to 1.5° C./min. and maintaining the temperature for about 10 to 14 hours to react the components and produce luminescent material, cooling the material by turning off the heat to the furnace and allowing the material to remain therein until the temperature is no higher than about 300° C., washing with deionized water, removing the wash water and drying, and classifying to obtain a −325 mesh particle size, forming a uniform blend of the phosphor and silicon dioxide wherein the amount of silicon dioxide is about 0.01% to 0.1% by weight, and wherein the silicon dioxide has a particle size of less than about 1 micrometer in diameter, and dry milling to produce a silicon dioxide coated phosphor having a bulk density of at least about 50% greater than the phosphor produced absent the coating and a luminescence improvement of at least about 4% over the phosphor produced absent the coating.

3 Claims, No Drawings

PROCESS FOR IMPROVING THE LUMINESCENCE AND BULK DENSITY OF NIOBIUM ACTIVATED YTTRIUM TANTALATE X-RAY PHOSPHOR

BACKGROUND OF THE INVENTION

This invention relates to a process for improving the physical properties such as phosphor flow characteristics and x-ray packing properties of the niobium activated yttrium tantalate x-ray phosphor which in turn improves the image quality of the radiographs when used in intensifying screens. The improvements are obtained by coating the phosphor with a fine size silicon dioxide. This coated phosphoor exhibits a uniform packing of the phosphor particles without voids when used for measurement in measuring cells or in intensifying screens.

X-ray phosphors are used in x-ray intensifying screens which are used along with photographic film to enhance the photographic image formed on the film at the same time reducing the x-ray dose on the object during medical radiographic procedures. Phosphor materials used in these intensifying screens are to be colorless single phase materials with a polyhedral shape of well-defined crystal morphology. Also, the phosphors have to be good x-radiation absorbers and emit the light in the spectral region to which the film is sensitive. Generally, it is required that the phosphor particle size be about 4-11 micrometers in order to form a thin layer when drawn in the form of screens using certain binder solutions as media. In order to have high quality radiographic image quality, these screens have to be void free with smooth uniform layer of phosphor particle-binder solution drawn on the substrate. The substrate is usually a mylar sheet. In order to have smooth uniform packing layers of the phosphors, these materials are coated by certain coating agents and also some dispersant agents in order to create conditions that all the light emitted from the phosphor realized with minumum loss due to scattering, self absoptions, etc. It is also required that the phosphor particles be uniformly and closely packed on the screen with minimum voids which increases the image quality of the radiographs.

U.S. Pat. No. 4,225,653 describes the preparation and the crystal structure of M' phase rare earth tantalate materials and their luminescent properties. It also demonstrates that the M' $YTaO_4$ phase is an efficient host for x-ray phosphors when activated with niobium and some rare earth ions compared to M phase $YTaO_4$ (furgusonite). However, preparation and post firing processes are critical to obtain a good quality phosphor that gives enhanced phosphor brightness and flow characteristics that in turn result in improved radiographic quality when used in medical intensifying screens.

SUMMARY OF THE INVENTION

It is an object of the present invention to provide a process for producing M' $YTaO_4$:Nb x-ray phosphor for intensifying screen applications.

It is another object of the present invention to provide a method for producing a coated niobium activated yttrium tantalate phosphor.

It is a further object of the invention to provide a process for producing an improved luminescent efficiency (brightness) niobium activated yttrium tantalate phosphor which gives improved quality radiographs due to better packing of the phosphor particles when used in intensifying screens. The uniform packing gives better luminescence output without much energy loss of light scattering.

In accordance with one aspect of the invention, there is provided a process for producing M' phase $YTaO_4$:Nb X-ray phosphor which comprises forming a mixture of components $Y_2O_3$, $Ta_2O_5$, and $Nb_2O_5$, and a flux which can be lithium chloride, lithium sulfate or a mix of lithium sulfate and potassium sulfate in an 80 to 20 mole ratio, the flux making up about 25% to 50% by weight of the mixture, the components being provided in stoichiometric amounts to form the phosphor, firing the mixture in a furnace by heating to a temperature of about 1200° C. to 1300° C. at a heating rate of about 1.0° C./min. to 1.5° C./min. and maintaining the temperature for about 10 to 14 hours to react the components and produce luminescent material, cooling the material by turning off the heat to the furnace and allowing the material to remain therein until the temperature is no higher than about 300° C., washing with deionized water, removing the wash water and drying, and classifying to obtain a −325 mesh particle size, forming a uniform blend of the phosphor and silicon dioxide wherein the amount of silicon dioxide is about 0.01% to 0.1% by weight, and wherein the silicon dioxide has a particle size of less than about 1 micrometer in diameter, and dry milling to produce a silicon dioxide coated phosphor having a bulk density of at least about 50% greater than the phosphor produced absent the coating and a luminescence improvement of at least about 4% over the phosphor produced absent the coating.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention relates to a process for producing M'$YTaO_4$ x-ray phosphor which is coated with fine size silicon dioxide. The coating results in increased luminescence efficiency due to the improved surface characteristics resulting in uniform packing of the phosphor.

It has been demonstrated in U.S. Pat. No. 4,225,653 that the niobium activated yttrium tantalate which crystallizes in to a monoclinic M'structure gives high x-ray-to-light-conversion efficiency compared to those host materials that crystallize into M-structure of the composition that has the same formula $YTaO_4$. Substitution of niobium for tantalum improves significantly the blue fluorescence of M' structure $YTaO_4$. However, further improvements in the phosphor physical properties such as particle shape, flow characteristics and packing properties can result in better quality of radiographs when used in medical radiographic procedures.

A description of the preparation of the phosphor of the present invention is as follows.

A uniform mixture is formed consisting essentially of the components from which the phosphor is to be made and a flux. The components are $Y_2O_3$, $Ta_2O_5$, and $Nb_2O_5$. The components are provided in an amount equal to approximately the stiochiometric amount required to form the phosphor. The flux can be lithium chloride, lithium sulfate or a mix of lithium sulfate and potassium sulfate in a mole ratio of lithium sulfate to potassium sulfate of about 80 to 20 to form a eutectic mixture. The flux makes up from about 25% to about 50% and preferably about 30% to about 35% by weight of the mixture and most preferably about 33% by weight. The mixture is formed by the usual blending and mixing methods used in the phosphor industry.

Normally, the components and flux are milled with a milling fluid. The milling fluid can be essentially any in which the oxides and flux are insoluble. Some typical milling fluids are freon, acetone, or other solvents such as methyl alcohol, ethyl alcohol and isopropanol. The normal procedure for milling is in a vibratory mill such as SWECO mill. A preferred but non-limiting procedure for milling about 660-670 g of components with an equal amount of flux material is to mill for about 1.0 hours with about 500 ml of milling fluid using about 2 kg of high density alumina beads as milling media.

After the milling step, the milling media and milling fluid are removed from the milled mixture. The milling fluid is removed by allowing the milled mixture and fluid to dry usually at room temperature for a sufficient time to allow all the fluid to evaporate. This amount of time is usually about 6 to 12 hours when freon is used. The milled mixture is dried at from about 120° C. to about 150° C. when the milling fluid is acetone.

An alternate method is to form a first mixture of the reactive components by first dry blending and then milling this first mixture with a milling fluid as described above. The milling fluid can be any of those described above. In addition, water can be used as the milling fluid since the oxides are insoluble in water. The flux can then be added to the first mixture to form a second mixture.

Still another method of forming the reactive component-flux mixture is dry blend the components with the flux after the components have been pre-blended and pre-classified.

In any case the reactive components and the flux are then fired according to the following specific heating schedule to produce a fired material containing luminescent material. The reactive component-flux mixture is loaded into a furnace typically an electric or gas-fired furnace, preferably in covered alumina containers. The furnace is then heated slowly usually from about 300° C. up to a temperature of from about 1200° C. to about 1300° C. at a heating rate of from about 1.0° C. per minute is about 1.5° C. per minute. This usually takes about several hours. This temperature range is maintained for from about 10 hours to about 14 hours.

The resulting fired material is then cooled according to a specific cooling schedule. The heat to the furnace is turned off and the fired material is allowed to remain in the furnace until the furnace has cooled to no higher than about 300° C. When a temperatue of about 300° C. or lower is reached, the cooled material can be taken out of the furnace.

The above described slow heating and cooling procedure ensures better reactivity of the components of the mixture with the flux being melted.

The resulting cooled material is then washed with deionized water to remove the fluxes and other water soluble material that may be present. This is usually done by slurrying the cooled material repeatedly with fresh deionized water and testing for absence of sulfates when lithium sulfate is used as the flux or chlorides when lithium chloride is used as the flux. The wash water is then removed from the washed material. Other washes can be put on the material such as alcohols to force dry the phosphor material if desired.

The washed material which is M' phase niobium activated yttrium tantalate phosphor is dried usually at about 120° C. in an oven.

The phosphor is then classified to obtain a −325 mesh particle size.

The phosphor is now treated with fine size silicon dioxide to produce a coating on the phosphor particles to improve packing and flow characteristics of the phosphor that improves the phosphor brightness. The coating with silicon dioxide is done as described below.

A uniform dry blend is formed of the classified −325 mesh phosphor and fine size silicon dioxide (silica). The silicon dioxide makes up about 0.01% to about 0.1% by weight of the blend. The silicon dioxide powder has a particle size of less than about 1 micrometer in diameter and preferably about 0.016 to about 0.020 micrometers in diameter. The preferred source of silicon dioxide is supplied by Cabot Corporation under the name of "Cab-O-Sil" preferably M-5. The phosphor and silicon dioxide are dry blended normally for about 15 to about 20 minutes in a mechanical shaker.

This blend is then dry ball milled usually with 6 millimeter glass beads usually for about another 15-45 minutes on a roll mill. Due to the high surface area and high surface energy these fine size silicon dioxide particles coat the particle surfaces of the phosphor and as a result, the flow characteristics and packing properties of the phosphor are improved. This change in uniform packing properties shows remarkable improvements in the brightness properties of the phosphor. The coated phosphor bulk density is improved by at least about 50% and usually about 53% to about 67% compared to uncoated phosphors. For certain applications, the bulk density improvements can be of importance when phosphor powder or processed pellets or disks are used in x-ray detectors, scintillators or in intensifying screens. The brightness improvements of the coated phosphor are about 4 to about 7% compared to the uncoated phosphor. However, higher amounts of silicon dioxide coating cause problems during x-ray screen preparation due to large increases in the surface area of the phosphor. In order to limit the surface area increases and then improve the phosphor properties an optimum level of about 0.02 to about 0.03% silicon dioxide is used to coat the phosphor.

To more fully illustrate this invention, the following nonlimiting examples are presented.

EXAMPLE 1

About 225.81 grams of $Y_2O_3$, 433.05 grams of $Ta_2O_5$, and 5.316 grams of $Nb_2O_5$ are blended. The blend is then SWECO milled in freon (trichlorotribluoro ethane) with about 2 kg of ¼" alumina beads as milling media in a SWECO mill for about 2 hours. After milling the material is dried and the alumina beads are separated. About 332 g of lithium sulfate flux material is added and the resulting mixture is blended on a mechanical shaker for about 0.5 hour. The material is then loaded into alumina crucibles and fired at about 1290° C. for about 10-14 hours using a slow heating cooling schedule. After being cooled to room temperature, the fired material is soaked in hot deionized water for about 6-12 hours. The flux material is washed off with subsequent deionized water washings until the wash water is free of sulfate. Once the flux is washed off, the material is filtered, dried at about 120° C. and sieved through a 325 mesh screen. The composition of the resulting phosphor is $YTa_{0.98}Nb_{0.02}O_4$ and it is a M' phase $YTaO_4$. The luminescence intensity of this phosphor is measured by exposing a 5–10 g sample in a cell to 66 KV 25 MA x-radiation and detecting the luminescence emission using a S-20 surface photomultiplier. The signal from the photomultiplier is fed to a photometer and the amplified signal is then plotted on a strip chart and the intensity of emission is compared to a known standard. The luminescence intensity of this sample is used as control for brightness measurements.

EXAMPLE 2

Similar amounts of $Ta_2O_5$, $Y_2O_3$, and $Nb_2O_5$ as used in example 1 are weighed and blended. The blend is then SWECO milled in freon (trichlorotrifluoro ethane) for about 2–4 hours. The milled material is dried and the alumina beads are separated. The mixture is then added with flux material in an amount of about 50% by weight and the resulting mixture is ball milled for about 0.5–1 hr. The milling media is separated from the mixture and the mixture is loaded into alumina crucibles and fired at about 1300° C. as described in example 1. The fired cakes are soaked in deionized water, filtered and dried. The resulting phosphor is a M' $YTaO_4$ and its composition is $YTa_{0.98}Nb_{0.02}O_4$. This phosphor is then classified through a $-325$ mesh screen and the phosphor luminescence intensity is measured as described in Example 1. The bulk density is measured by a standard procedure. This phosphor is then blended with a 0.02 weight percent of fine size silica, Cab-O-Sil, to coat the phosphor. After coating, the phosphor is measured for its brightness and powder bulk density. The brightness before coating is about 113% against the Control compared to about 117% obtained on the coated phosphor. The bulk density of the uncoated phosphor is about 1.265 gms/cm$^3$ compared to about 2.111 gms/cm$^3$ for the coated phosphor.

EXAMPLE 3

Similar amounts of oxide raw materials as given in Examples 1 and 2 are weighted out and blended. The blended mixture is dry SWECO milled (no solvents). With about 2.0 kgs pf ¼" alumina beads for about 2–4 hours. A LiCl flux material of 50% by weight is added to this mixture and remilled again for 0.5 hr. The milling media is separated and the powder is loaded into alumina crucibles and fired as described in Example 1. Fired cakes are soaked in deionized water, the flux is washed off and the phosphor is filtered and dried. The dried material is classified by sifting through a $-325$ mesh screen and the phosphor is measured for its brightness by a procedure described in Example 1. The bulk density of the phosphor is measured by standard methods. The phosphor is then coated with 0.02 weight percent of fine size silica (Cab-O-Sil). The control sample brightness and bulk densities are measured as previously described. The brightness of the uncoated phosphor is about 110% compared to about 117% brightness obtained for the coated phosphor. The bulk density of the coated phosphor is about 1.709 gms/cm$^3$ compared to the bulk density of 1.110 gms/cm$^3$ for the uncoated phosphor.

These examples indicate that the packing properties of the phosphor, as demonstrated by bulk density data are improved and the phosphor brightness properties are also improved. The improvements are useful when the phosphor is used in certain applications such as x-ray scintillation, x-ray detectors, intensifying screens.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for preparing a M' $YTaO_4$:Nb X-ray phosphor having a coating of silicon dioxide, said process comprising:
   (a) forming a uniform mixture consisting essentially of $Y_2O_3$, $Ta_2O_5$, and $Nb_2O_5$ components, and a flux selected from the group consisting of lilthium chloride, lithium sulfate and a mix of lithium sulfate and potassium sulfate the mole ratio of lithium sulfate to potassium sulfate in said mmix being about 80 to 20, wherein said flux makes up from about 25% to about 50% by weight of said mixture, said components being provided in an amount equal to approximately the stoichiometric amounts required to form said phosphor;
   (b) firing said mixture in a furnace by heating said mixture in said furnace from a temperature of about 300° C. to a temperature of from about 1200° C. to about 1300° C. at a heating rate of from about 1.0° C. per minute to about 1.5° C. per minute and maintaining said temperature for from about 10 hours to about 14 hours to react said components and produce a fired material containing luminescent material;
   (c) cooling the resulting fired material by turning off the heat to said furnace and allowing said fired material to remain in said furnace until the temperature in said furnace is no higher than about 300° C.;
   (d) washing the resulting cooled material with deionized water to remove essentially all of said flux therefrom and produce a washed M' niobium activated yttrium tantalate phosphor;
   (e) removing the wash water from and drying said washed phosphor;
   (f) classifying the resulting dried phosphor to obtain a $-325$ mesh particle size in said phosphor;
   (g) forming a uniform blend consisting essentially of the resulting classified phosphor and silicon dioxide wherein the amount of said silicon dioxide is from about 0.01% to about 0.1% by weight of said blend, and wherein said silicon dioxide has a particle size of less than about 1 micrometer in diameter; and
   (h) dry milling said blend to produce a silicon dioxide coated phosphor having a bulk density of at least about 50% greater than said classified phosphor produced absent said coating and having a luminescence improvement of at least about 4% over said classified phosphor produced absent said coating.

2. A process of claim 1 wherein the particle size of said silicon dioxide is from about 0.016 to about 0.020 micrometers in diameter.

3. A process of claim 1 wherein said silicon dioxide makes up about 0.02% to about 0.03% by weight of said blend.

* * * * *